United States Patent [19]
Van Der Tol

[11] Patent Number: 5,375,178
[45] Date of Patent: Dec. 20, 1994

[54] INTEGRATED OPTICAL POLARIZATION MANIPULATING DEVICE

[75] Inventor: Johannes J. G. M. Van Der Tol, Zoetermeer, Netherlands

[73] Assignee: Koninklijke PTT Nederland N.V., Groningen, Netherlands

[21] Appl. No.: 184,395

[22] Filed: Jan. 19, 1994

[30] Foreign Application Priority Data

Feb. 2, 1993 [NL] Netherlands .................. 9300205

[51] Int. Cl.$^5$ ............................................. G02B 6/12
[52] U.S. Cl. .................................... 385/11; 385/14; 385/42; 385/50
[58] Field of Search ................. 385/11, 14, 42, 50, 385/9, 28–31, 43, 129

[56] References Cited

U.S. PATENT DOCUMENTS

| | | | |
|---|---|---|---|
| 5,119,450 | 6/1992 | Ranganath et al. | 385/14 |
| 5,185,828 | 2/1993 | Van Der Tol | 385/28 |
| 5,257,330 | 10/1993 | Van Der Tol | 385/11 |
| 5,285,507 | 2/1994 | Van Der Tol | 385/11 |
| 5,293,436 | 3/1994 | Diemeer | 385/11 |

FOREIGN PATENT DOCUMENTS

0522625A1  1/1993  European Pat. Off. .............. 385/11

OTHER PUBLICATIONS

J. J. G. M. Van Der Tol et al., "A Polarization Splitter on LiNbO$_3$ Using Only Titanium Diffusion", Jul. 1991, pp. 879–886, Journal of Lightwave Technology, No. 7.
J. J. G. M. Van Der Tol et al., "Measurement of Mode Splitting in Asymmetric Y–Junctions", May 1992, pp. 454–457, IEEE Photonics Technology Letters, No. 5.
K. Matsubara et al., "Y–Branch TE–TM Mode Splitter Using Multilayered Waveguide", May 1992, pp. 1636–1640, Japanese Journal of Applied Physics, Part 1, No. 5b.

*Primary Examiner*—John D. Lee
*Assistant Examiner*—Phan Thi Heartney
*Attorney, Agent, or Firm*—Frishauf, Holtz, Goodman & Woodward

[57] ABSTRACT

An integrated optical, polarization-manipulating device, comprises a first waveguiding section (A) with a first guide (21), a second waveguiding section (E) with a second and a third optically decoupled and physically separated guide (26, 27) and an intermediary waveguiding section (C) for an adiabatic coupling between the first and the second sections (A, B). The intermediary section (C) comprises a polarization-sensitive asymmetric Y-branching device, provided with two mutually diverging intermediary guides (24, 25), a monomodal (24) and a bimodal (25), coupled to the guides (26, 27), respectively, of the second section. The guides (21, 27) form, with dummy guides (22, 28), respectively, polarization-insensitive asymmetric Y-junctions which function as mode converters between zeroth- and first-order guided modes. Bimodal coupling sections (B, D) provide for adiabatic couplings between asymmetric Y-junctions and the intermediary section (C). Advantages: the device can be provided on non-birefringent materials; is relatively simple to manufacture; and, in the case of the ridge-type guide structure, only one etching step is required.

4 Claims, 4 Drawing Sheets

INTEGRATED OPTICAL POLARIZATION MANIPULATING DEVICE

BACKGROUND OF THE INVENTION

1. Field of the invention

The invention is in the field of integrated optical devices. More in particular, it relates to integrated optical devices for manipulating the polarization of optical signals, in this case splitting, combining or filtering.

2. Prior Art

Integrated optical devices which deal polarization, such as polarization splitters, are used, inter alia, in integrated embodiments of coherent optical receivers, in which detection takes place on the basis of polarization diversity. In a global sense, two kinds of integrated optical polarization splitters of this type are known. The one kind is based on interference, use being made, for the purpose of splitting two mutually orthogonal polarizations TE and TM of/in an optical signal, of the difference in phase between a fundamental and a first-order propagation mode of the polarizations. The other kind is based on the so-called "mode sorting effect". In this case, use is made of the difference in propagation preference of the polarizations for the two output channels, which differ from each other in terms of propagation constant, of an asymmetric Y-junction. The propagation preference is based on the fact that the asymmetry for the two polarizations differs in sign, which can be achieved by using birefringent materials. Thus, reference [1] discloses a polarization splitter on lithium niobate, with a waveguide structure, obtained by means of Ti diffusion therein, for the Y-junction, the opposite asymmetry being based on anisotropy in the increase of the refractive index as a result of the Ti diffusion. Reference [2] discloses a polarization splitter with a waveguide structure for the Y-junction on the basis of transparent polable polymer. In this case use is made of the fact that polable unpoled polymer is not birefringent, whereas poled polymer is, the poled state showing, with respect to the unpoled state, a refractive index difference which, for the two polarizations, differs in sign between one another.

Since at present it is customary, in optical communication systems, to choose a wavelength for the optical signal in the near infrared, an integrated optical receiver provided with a polarization splitter of this type can, given the current prior art, only be provided on the basis of semiconductor material such as indium phosphide (InP). A polarization splitter of the first type, implemented on InP, is disclosed, for example, by reference [3]. This known polarization splitter makes use of the polarization-dependent effect of a metal layer on the propagation of the guided modes in a directional coupling structure. Such a directional coupling structure provided with a metal layer, however, makes stringent demands on fabrication technology and presents additional complications during manufacture thereof. In a polarization splitter based thereon, the presence of the metal layer leads to unwanted additional attenuations of optical signals propagating therein. In a patent application not published at the time of filing, to wit reference [4], a polarization splitter is described which can be implemented very readily on InP and does not have the drawbacks mentioned of the polarization splitter disclosed by reference [3]. This known polarization splitter, which can be regarded as a kind of hybrid of the two kinds of polarization splitters indicated, consists of a mode converter having a periodic structure, in which one of the two polarizations is converted into a different order of guided mode, in combination with an asymmetrical Y-junction. Both the known polarization splitters which can be implemented on InP have the drawback, however, that they show a strongly wavelength-dependent behaviour.

The splitters of the above-indicated second kind have major advantages compared to those of the first kind. Namely, they are less wavelength-sensitive and require less stringent fabrication tolerances. Moreover, they show very low attenuation and very low optical-signal reflection in the input channel which is important, particularly in the case of coherent detection employing narrow-band lasers. As the material indium phosphide is not birefringent, an implementation of a polarization splitter corresponding to that in lithium niobate or that in polable polymer is not possible. It is, however, possible, in thin light-guiding layers of non-birefringent materials, to implement waveguides which have different propagation behaviour for the two polarizations and in which, therefore, birefringence occurs. Birefringence of this type is known under the names waveguide birefringence, geometric birefringence or shape birefringence. It is caused by waveguides being formed on the surface of a substrate. The polarization in which the dominant electric field component is perpendicular to the surface of the substrate, in this case the TM polarization, as a result experiences a different propagation than the polarization parallel to that surface, in this case the TE polarization. This effect can be influenced either, as disclosed by reference [5], by arranging a suitable layer above or below the waveguide in a planar waveguiding layer, or, as disclosed by reference [6], by arranging a composite layer structure ("superlattice"), in which case, by specific choice of the layer structure, channel-shaped waveguides are obtained which are selective for one of the two polarization modes. Reference [7] discloses polarization-manipulating 3-gate and 4-gate devices, including a polarization splitter of the second kind, in which shape birefringence of this type, based on a suitably chosen layer structure, is applied. A 3-gate device such as a polarization splitter comprises two waveguides having cores of different materials and with different effective refractive indices. In a transition section, between a first waveguiding section and a second waveguiding section, the cores overlap and one of the waveguide cores has an adiabatic taper. In the transition section, the two waveguides diverge adiabatically into physically separate and optically decoupled waveguides in the second waveguiding section. Integrated optical devices, in which shape birefringence of this type, based on a suitably chosen layer structure is applied, have the drawback, however, that their manufacture is rather laborious, not only owing to the number of necessary manufacturing steps, but also owing to the number of different materials to be used.

SUMMARY OF THE INVENTION

The object of the invention is to provide a structure for a polarization-manipulating device, more in particular a polarization-splitting device of the abovementioned second kind, which can be implemented on the basis of non-birefringent materials such as indium phosphide and does not have the abovementioned drawback. In so doing, it makes use of the fact that, while in thin light-guiding layers the zeroth-order modes of the two polarizations show small differences in propagation, said differences in propagation for the first-order modes, however, and more generally for higher-order modes, are relatively much larger. Consequently, the degree of structural birefringence in a bimodal, more generally a multimodal waveguide, is much greater for first- and higher-order modes than for the zeroth-order modes. An integrated optical device for manipulating the polarization of light-wave signals, comprising a substrate, and an optical-waveguide thin layer supported by the substrate and provided with a first waveguiding section including a first channel-shaped waveguide, a second waveguiding section including second and third channel-shaped waveguides which are optically decoupled and physically separated, and an intermediary waveguiding section for an adiabatic coupling between the first and the second waveguiding sections, including an asymmetric Y branching device provided with a first and a second, mutually diverging intermediary channel-shaped waveguide, coupled, respectively, with the second and the third waveguides of the second section, to this end according to the invention is characterized in that the first intermediary waveguide has a waveguide profile corresponding to a first guide modality for the propagation of a first guided mode for each of both polarizations, the second intermediary waveguide has a waveguide profile corresponding to a second guide modality of higher order than the first guide modality for the propagation of said first guided mode and a second guided mode of higher order than the first for each of both polarizations, the difference of the propagation constant of said first guided mode in the first intermediary waveguide and the propagation constant of said second guided mode in the second intermediary waveguide for the one polarization differing in sign from the difference of the propagation constant of said first guided mode in the first intermediary waveguide and the propagation constant of said second guided mode in the second intermediary waveguide of the other polarization.

In a preferred embodiment, all the waveguides forming part of the device are of the ridge type.

The integrated optical device according to the invention has the following advantages:
- the manufacture of the device does not require fabrication steps other than those required for the manufacture of channel-shaped waveguides on the integration material to be used;
- there is good integrability with other devices;
- when employing ridge-type waveguides, the manufacture of the whole device requires only one etching step;
- by employing the "mode sorting effect" in asymmetrical Y-junctions
  - the operation of the device is not critically dependent on the various parameters (such as angles, widths of the channel-shaped waveguides), so that the device has ample fabrication tolerances;
  - the device can be used in a wide wavelength range;
  - the device has low attenuation and reflection; and
  - the device operates stably under varying operating conditions.

REFERENCES

[1] J. J. G. M. van der Tol and J. H. Laarhuis: "A polarization splitter on lithium niobate using titanium diffusion only", IEEE J. Lightw. Techn., Vol. 9, No. 7, July 1991, pp. 879–886;

[2] EP-A-0444721;

[3] P. Albrecht, et al.: "TE/TM mode splitters on InGaAsP/InP", IEEE Phot. Techn. Lett., Vol. 2, No. 2, February 1990, pp. 114,115;

[4] European patent application no. 92201338.8 (by applicant; not yet published);

[5] J. Aarnio et al.: "Birefringence control and dispersion characteristics of silicon oxynitride optical waveguides", Electronics Letters, Vol. 27, No.25, Dec. 5, 1991, pp. 2317, 2318;

[6] Y. Suzuki, et al.: "Polarization mode selective channel waveguides in an InGaAs/InP disordered superlattice", Appl. Phys. Lett., Vol. 57, No. 26, Dec. 24, 1990, pp. 2745–2747;

[7] EP-A-0389172;

[8] NL 9300205 (Dutch priority patent application of the present application).

All references are considered to be incorporated in the present application.

SHORT DESCRIPTION OF THE DRAWING

The invention will be explained below in more detail with reference to a drawing which comprises the following figures:

FIG. 1a shows, in diagrammatic form, a cross-sectional profile of a waveguide of the ridge type;

FIG. 1b sketches, for the waveguide of the ridge type shown in FIG. 1a, the variation of the normalized propagation constants of each of the polarizations in the zeroth- and first-order guided mode as a function of the ridge width;

FIG. 2b shows the propagation course of a TE signal through the waveguide structure depicted in FIG. 2a;

FIG. 2c shows the propagation course of a TM signal through the waveguide structure depicted in FIG. 2a.

DESCRIPTION OF AN ILLUSTRATIVE EMBODIMENT

Figure 1A:
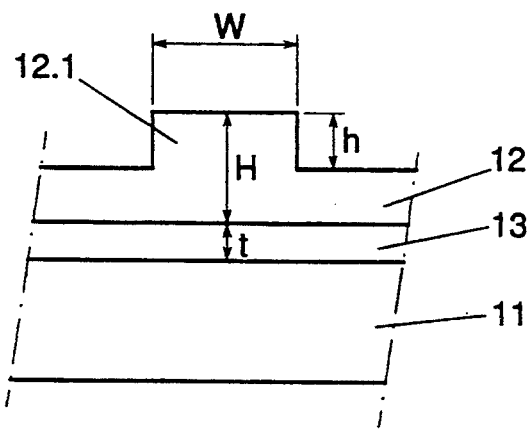

Use is made, in polarization-manipulating devices, for example a polarization splitter, which are based on the so-called "mode sorting effect", of difference in propagation preference of the polarizations for the two output channels, which differ from each other in their propagation constant, of an asymmetric Y-junction. Such a propagation preference is based on the fact that the asymmetry for the two polarizations differs in sign, which can be achieved by employing birefringence in at least one of the output channels. As is known, such birefringence can be achieved not only by selecting a birefringent material, but also by means of a special structure, in this case layer structure, of a number of suitably chosen non-birefringent materials for the waveguides. A birefringence of this type, due to the structure of a waveguide, is designated hereinafter as structural birefringence or waveguide birefringence. This occurs in the case of waveguides in thin layers, for example on the surface of a substrate. Light propagation in thin layers of this type is polarization-sensitive, in general. The polarization at which the dominant electric field component is perpendicular to the surface, i.e. the TM polarization, consequently experiences a different propagation than the polarization parallel to the surface, i.e. the TE polarization. The polarization sensitivity can, as is known and indicated in the above, be influenced by a special layer structure directly above (or below) the plane in which the light propagation proper takes place. This is possible because the evanescent field, that is to say the tails of the optical/electromagnetic field belonging to a guided mode of an optical signal propagating in the thin layer, runs on in the direction in which the dominant electric field component is standing. For the TM polarization, this direction is the normal, that is to say perpendicular to the substrate, while that for the TE polarization in contrast is the lateral direction. In the prior art, the intention therefore is, by suitable choice of a layer structure, to influence the polarization-sensitivity in a direction perpendicular to the substrate, which obviously complicates the manufacture of optical devices based thereon. In so doing, possibilities for increasing the structural birefringence by further increase of the differences in propagation of the zeroth-order modes of the polarizations are always looked for. In channel-shaped guides in thin light-guiding layers, however, the first-order modes of the polarizations are found to exhibit such large differences in propagation that it is possible to implement therewith an asymmetric Y-junction having a sufficiently large asymmetry for a polarization-splitting effect. This is explained hereinafter. It should be emphasized in this context that, although the description hereinafter is limited, only by way of example, to "ridge"-type channel structures on the basis of indium phosphide (InP), the invention can be implemented with any type of channel structure current in integrated optics (e.g. "ridge" type, "buried" type, "strip loaded" type) in light-guiding layers of non-birefringent materials.

FIG. 1a depicts, diagrammatically, a cross-sectional profile of a ridge-shaped waveguide on the basis of indium phosphide (InP). Between a substrate 11 and a top layer 12, both of InP, a light-guiding layer 13 is present, the so-called quaternary layer of InGaAsP of thickness t. Locally over the length of the guide, the top layer 12 has a ridge-shaped elevation 12.1 with height h and width w, which is obtained, for example, starting from a top layer having an original thickness H, by partial etching-away. As is known, such an elevation 12.1, if the dimensions (h, H, w and t) are suitably chosen, effects a lateral delimitation for a light wave propagating in the light-guiding layer, so that a light-guiding channel is produced. Starting from suitably chosen t, H and h, variation of the width w is found to result in light-guiding channels which are monomodal, bimodal, trimodal etc., i.e. are suitable for guiding one, two, three etc., respectively, guided modes of an optical signal having a given wavelength. This is expressed in this description by saying that a light-guiding channel has a guide modality of the order one, two, three etc. Expressed in this way, a monomodal channel has a guide modality of the order one, a bimodal channel a guide modality of the order two etc. Whether a light-guiding channel for a given width is mono-, bi- or trimodal, etc., does however also depend on the polarization of the guided modes. In order to be able to compare the behaviour of the propagation constant $\beta$ for the various guided modes in such a guide as a function of the ridge width, the propagation constant is subjected to conventional normalization. According to this normalization, the normalized propagation constant b for the polarization TX and the ith-order guided mode as a function of the ridge width w is defined as follows:

$$b(TX,i,w) = \{(\beta(TX,i,w)\lambda/2\pi)^2 - N_\perp^2(TX)\}/\{N_{81}^2(TX) - N_\perp^2(TX)\} \quad (1)$$

Figure 1B:
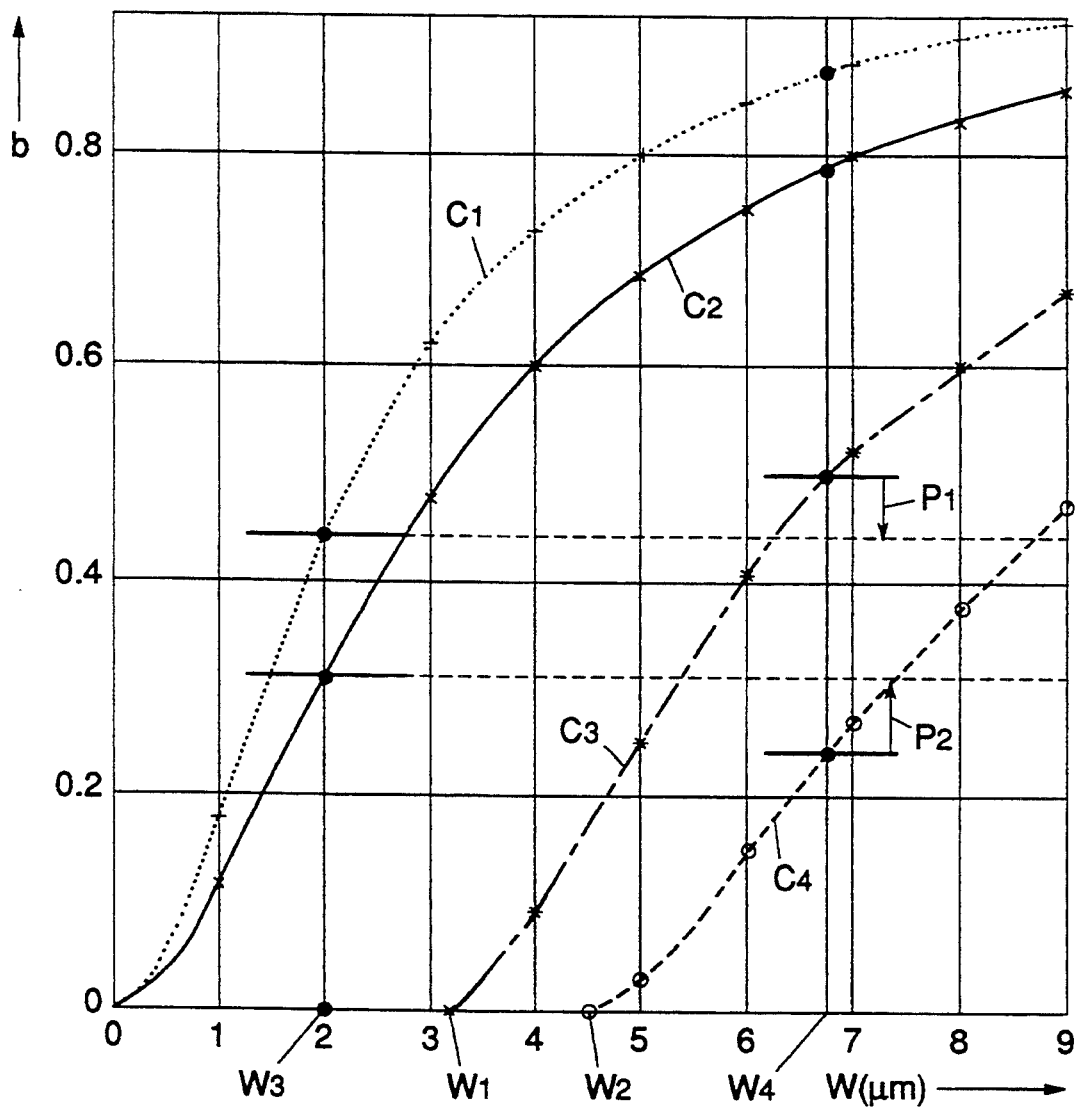

Here, $\beta(TX,i,w)$ is the propagation constant of the polarization TX (i.e. TE or TM) in the ith-order guided mode (with i=0 for the zeroth or 1 for the first order) as a function of the ridge width w, $\lambda$ is the wavelength of the optical signal, $N_\perp(TX)$ and $N_\parallel(TX)$ are the effective refractive indices next to and below the ridge, respectively, for the polarization TX. In FIG. 1b, the qualitative variation is sketched of the normalized propagation constant b of each of the polarizations, both in the zeroth- and in the first-order guided mode, as a function of the ridge width for given (constant) t, H and h. In the figure, the curves $c_1$ (dotted line) and $c_2$ (full line) correspond to the normalized propagation constant b for (TX=TM, i=0) and (TX=TE, i=0), respectively, while the curves $c_3$ (dot-and-dashed line) and $c_4$ (broken dashed line) correspond to the normalized propagation constant b for (TX=TM, i=1) and (TX=TE, i=1), respectively. The course of the curves $c_1$ to $c_4$, inclusive, indicates that a guide having a ridge width $w \leq w_1$ (approximately 3.2 $\mu$m) is monomodal for both polarizations and a guide having a ridge width $w \geq w_2$ (approximately 4.4 $\mu$m) is bimodal for both polarizations; and furthermore that two ridge widths $w_3$ and $w_4$ can be chosen in a simple manner, which correspond, respectively, to a monomodal and a bimodal waveguide, in such a way that the relationship holds good for the normalized propagation constants:

$$b(TM,0,w_3) < b(TM,1,w_4) \text{ and}$$
$$b(TE,1,w_4) < b(TE,0,w_3) \quad (2)$$

Such a pair of ridge widths is, for example, $w_3 = 2.0$ $\mu$m and $w_4 = 6.7$ $\mu$m, for which the two inequalities in the relationship (2) are indicated in the figure by the difference arrows $p_1$ and $p_2$, respectively. It should be noted that the normalized propagation constants for the zeroth-order guided modes of the bimodal guide having width $w = w_4$ are at a much higher level (see the intersections of the line $w = w_4$ with the curves $c_1$ and $c_2$ in FIG. 1b), so that the inequalities in the relationship (2) can be augmented to give relationships (2.1) and (2.2):

$$b(TM,0,w_3) < b(TM,1,w_4) < b(TM,0,w_4) \quad (2.1)$$

and $$b(TE,1,w_4) < b(TE,0,w_3) < b(TE,0,w_4) \quad (2.2)$$

Pairs of curves such as $(c_1,c_2)$ and $(c_3,c_4)$ also exist for higher-order modes (i>1). If FIG. 1b were continued for increasing w, i.e. for channels having a guide modality of increasing order k, more and more of such pairs of curves $(c_{2k+1}, c_{2k+2})$ would appear in the figure, which, however, would lie at an increasing mutual distance. This means that it is always possible to find pairs of ridge widths $(w_3', w_4')$ for which relationships (2.1)' and (2.2)' hold good which are the generalizations of the relationships (2.1) and (2.2):

$$b(TM,i,w_3') < b(TM,j,w_4') < b(TM,i,w_4') \quad (2.1)'$$

and $$b(TE,j,w_4') < b(TE,i,w_3') < b(TE,i,w_4') \quad (2.2)'$$

for $0 < i < j$. That means that the channel having the ridge width $w_3'$ has a guide modality of at least the order i, and the channel having the ridge width $w_4'$ has a guide modality of at least the order $j(>i)$, for which the relationships (2.1)' and (2.2)' hold good for the normalized propagation constants of the guided modes in question for the two polarizations in those channels.

The invention uses such a pair of waveguiding channels, for which the relationships (2.1) and (2.2), or more generalized the relationships (2.1)' and (2.2)' hold good, as diverging outgoing channels of an asymmetric branching device in a Y-junction. This involves presenting, at the start of the asymmetric branching device, a signal, which may contain both polarizations, of the first-order, and in the generalized case, of the (i+j)th-order guided mode. In itself, such an asymmetric branching device is not directly useful as a polarization splitter, since in practical situations optical signals are generally presented and accepted as zeroth-order guided modes. To this end, it must be possible for the necessary polarization-insensitive mode conversions to take place in the input and output sections. The polarization-splitting proper of TE- and TM-signal components therefore takes place exclusively at the level of the presented first-order or the presented (i+j)th-order, respectively, guided modes. The following description of the illustrative embodiment is restricted, for the sake of simplicity and only by way of example, to the two lowest-order modes (i=0, j=1), but applies equally, mutatis mutandis, to the higher-order modes.

Figure 2A:
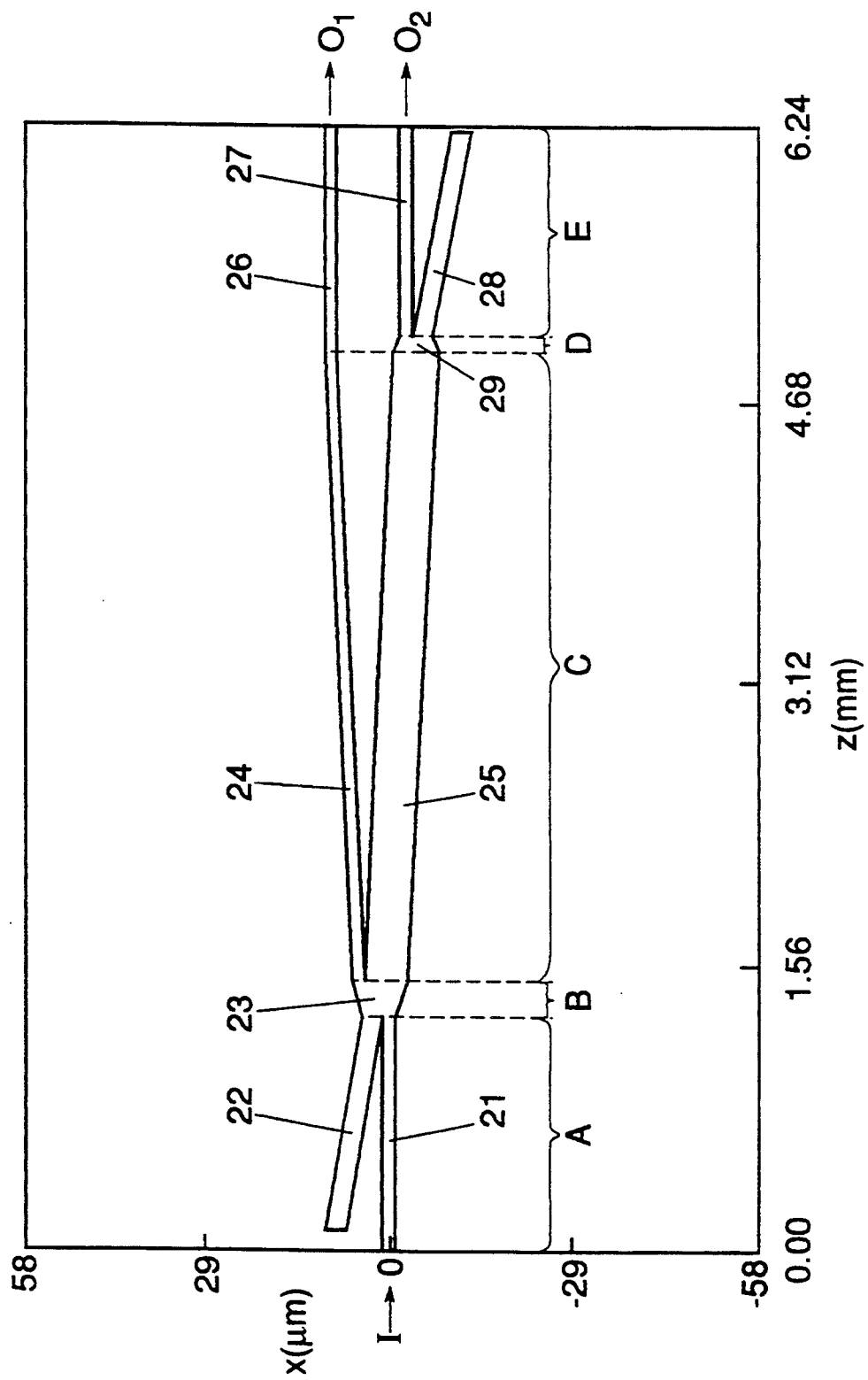
FIG. 2a shows, in diagrammatic form and to scale, a top view of an embodiment of the polarization splitter according to the invention.

In FIG. 2a, in top view and diagrammatically, a waveguide pattern is depicted of a polarization splitter based on an asymmetric branching device, in which one channel of the two branching channels is constructed to be monomodal and the other to be bimodal, the propagation constants of the two channels satisfying the relationships (2.1) and (2.2). The waveguide pattern is implemented as a ridge-shaped pattern in accordance with FIG. 1a. The waveguide pattern is composed of adiabatically adjoining waveguiding sections A, B, C, D and E, i.e. an input section A, a first coupling section B, a polarization-splitting section C, a second coupling section D and an output section E. The input section A comprises a mode converter, formed by an asymmetric Y-junction with two guides 21 and 22 which are both monomodal for both polarizations TE and TM, which guides converge from outside the region where they may be regarded as being decoupled, to a bimodal trunk at the input of the coupling section B. In this arrangement, the guide 22 for both polarizations has a somewhat greater propagation constant, for example as in the figure, owing to a somewhat greater ridge width than that of the guide 21, and the guide 21 forms the input guide proper for an incoming optical signal (arrow I), while the guide 22 is a dummy guide. The coupling section B consists of a tapered piece 23 for the adiabatic transition from a bimodal guide to a split structure of the polarization-splitting section C. To this end, the tapered piece 23 has a ridge width which gradually increases towards the section C. The angle at which the tapered piece 23 widens can be chosen to be equal to that in the section C, but is preferably greater, as drawn. The polarization-splitting section C comprises two diverging waveguides, a first monomodal waveguide 24, and a second bimodal waveguide 25. The waveguides 24 and 25 diverge as far as complete decoupling. The output section E comprises two monomodal output guides 26 and 27, respectively, for outgoing optical signals (arrows O1 and O2). The output guide 27 and a further monomodal guide 28 together form the diverging branches of an asymmetric Y-junction with a bimodal trunk, which functions as a mode converter. In this arrangement, the guide 28 has a somewhat greater propagation constant for both polarizations, for example as in the figure, owing to a somewhat greater width, than that of the guide 27. The guide 28 is a dummy guide which terminates at a distance from the guide 27, where the guides 27 and 28 can be regarded as being decoupled. The coupling section D consists of a tapered piece 29 for the adiabatic taper from the bimodal waveguide 25 to the bimodal guiding trunk of the asymmetric Y-junction in the output section E. It should be noted that in this embodiment the length of the bimodal trunk of the asymmetric Y-junctions in the input and output sections in both cases is chosen to be zero.

When dimensioning the branching guides in the polarization-splitting section C, ridge widths $w_{24}$ and $w_{25}$ are chosen for the monomodal guide 24 and the bimodal guide 25, which form a pair, such as the abovementioned pair $\{w_3, w_4\}$, so that the relationships (3.1) and (3.2) hold good for the normalized propagation constants in question:

$$b(TM,0,w_{24}) < b(TM,1,w_{25}) < b(TM,0,w_{25}) \quad (3.1)$$

and $$b(TE,1,w_{25}) < b(TE,0,w_{24}) < b(TE,0,w_{25}) \quad (3.2)$$

The polarization splitter having a waveguide pattern in accordance with FIG. 2a works as follows: a zeroth-order guided mode of the TE polarization, i.e. a $TE_{00}$ signal coming in (according to arrow I) via the input guide 21 will, owing to the proximity of the dummy guide 22, be converted into a first-order guided mode of the same polarization, i.e. a $TE_{01}$ signal and further propagate as such and, via the adiabatic transition in tapered piece 23, reach the split in the transition from section B to section C without being perturbed. There the $TE_{01}$ signal chooses the channel having the highest propagation constant but one for that polarization which, according to relationship (3.2) is the guide 24. Since the guide 24 is monomodal, the signal will propagate further as a $TE_{00}$ signal via the guide 24 and the output guide 26 of the output section E in the direction of arrow O1. A zeroth-order guided mode of the TM polarization, a $TM_{00}$ signal, also propagating via the input guide 21, will likewise first be converted into a first-order guided mode, a $TM_{01}$ signal, propagate further as such via the tapered piece 23 and will, having arrived at the split in the junction from the section B to the section C, propagate further via the channel having the highest propagation constant but one for that polarization. That channel now, however, according to relationship (3.1) is the bimodal guide 25. Therefore the $TM_{01}$ signal will propagate further as a first-order guided mode via the guide 25 and the tapered piece 29 of the coupling section D. At the branching guides 27 and 28 of the asymmetric Y-junction in the output section E a first-order mode signal propagates further in the channel having the lowest propagation constant, in this case the monomodal guide 27, being converted into a zeroth-order guided mode signal.

Therefore, the signal (arrow I) coming in via the monomodal input guide 21 and having an unknown polarization, in general containing a $TE_{00}$ component and a $TM_{00}$ component of arbitrary relative strength and an arbitrary relative phase, will be split into a signal (arrow O1), going out via guide 26 and containing (virtually) exclusively the $TE_{00}$ component and a signal (arrow O2), going out via guide 27 and containing (virtually) exclusively the $TM_{00}$ component.

It should be noted that a zeroth-order guided mode signal (TE or TM), which may propagate in the section B in the direction of the junction to the section C, chooses the channel of the largest propagation constant, which, according to the relationships (3.1) and (3.2) is the bimodal guide 25 for both polarizations. Once arrived at the junction of the coupling section D to the Y-junction of the output section E, it likewise chooses the channel having the largest propagation constant, in this case the dummy guide 28. This means that, if, for example owing to non-optimum design, the mode conversion in the input section A is not complete, in the device the non-converted part of the signal is split off from the part which has been converted, so that, on the one hand, signal capacity is lost but, on the other hand, the non-optimum conversion has no or very little "contaminating" effect on the splitting results in the guides 26 and 27.

EXAMPLE

In FIG. 2a the structure described hereinabove has already been depicted to scale. The length of the structure is depicted in mm along a z-axis, while the width of the structure is depicted in $\mu m$ along an x-axis. The polarization-splitting behaviour of this structure has been simulated with the aid of a simulation method generally known under the name beam propagation method. The following data were used for this simulation:

wavelength ($\lambda$) of the optical signal: 1.55 $\mu m$
refractive indices: InP: 3.1754, and InGaAsP: 3.4116
thickness (t) of the light-guiding layer 13 (InGaAsP): 460 nm
thickness (H-h) of the top layer 39 (InP): 250 nm
ridge height (h) above the top layer: 250 nm
Section A:
Length: 1180 $\mu m$; width of the ridge 21: 2.0 $\mu m$; width of the ridge 22: 3.2 $\mu m$; the approach angle between the ridges 21 and 22: 5.2 mrad (=0.3°);
Section B:
Length: 200 $\mu m$; width of the ridge 63: increasing from 5.2 $\mu m$ to 8.7 $\mu m$;
Section C:
Length: 3,500 $\mu m$; width of the ridge 24: 2.0 $\mu m$; width of the ridge 25: 6.7 $\mu m$; the receding angle between the ridges 24 and 25: 17.5 mrad (=1°);
Section D:
Length: 200 $\mu m$ decreasing in width from 6.7 $\mu m$ to 3.2 $\mu m$;
Section E:
Length: 1180 $\mu m$; width of the ridges 26 and 27: 2.0 $\mu m$; width of the ridge 28: 3.2 $\mu m$; the receding angle between the ridges 27 and 28: 5.2 mrad.

Figure 2B:
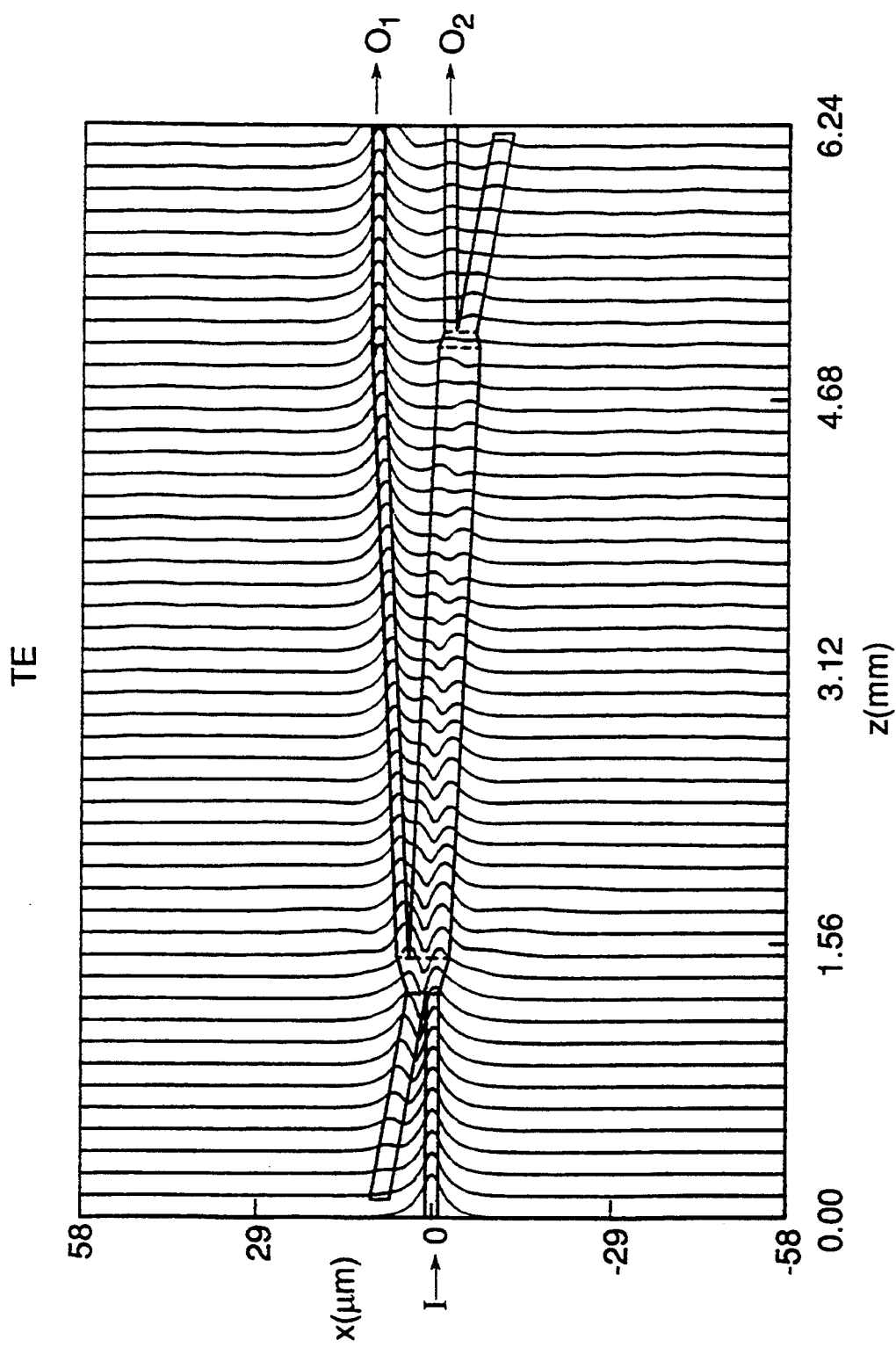
Figure 2C:
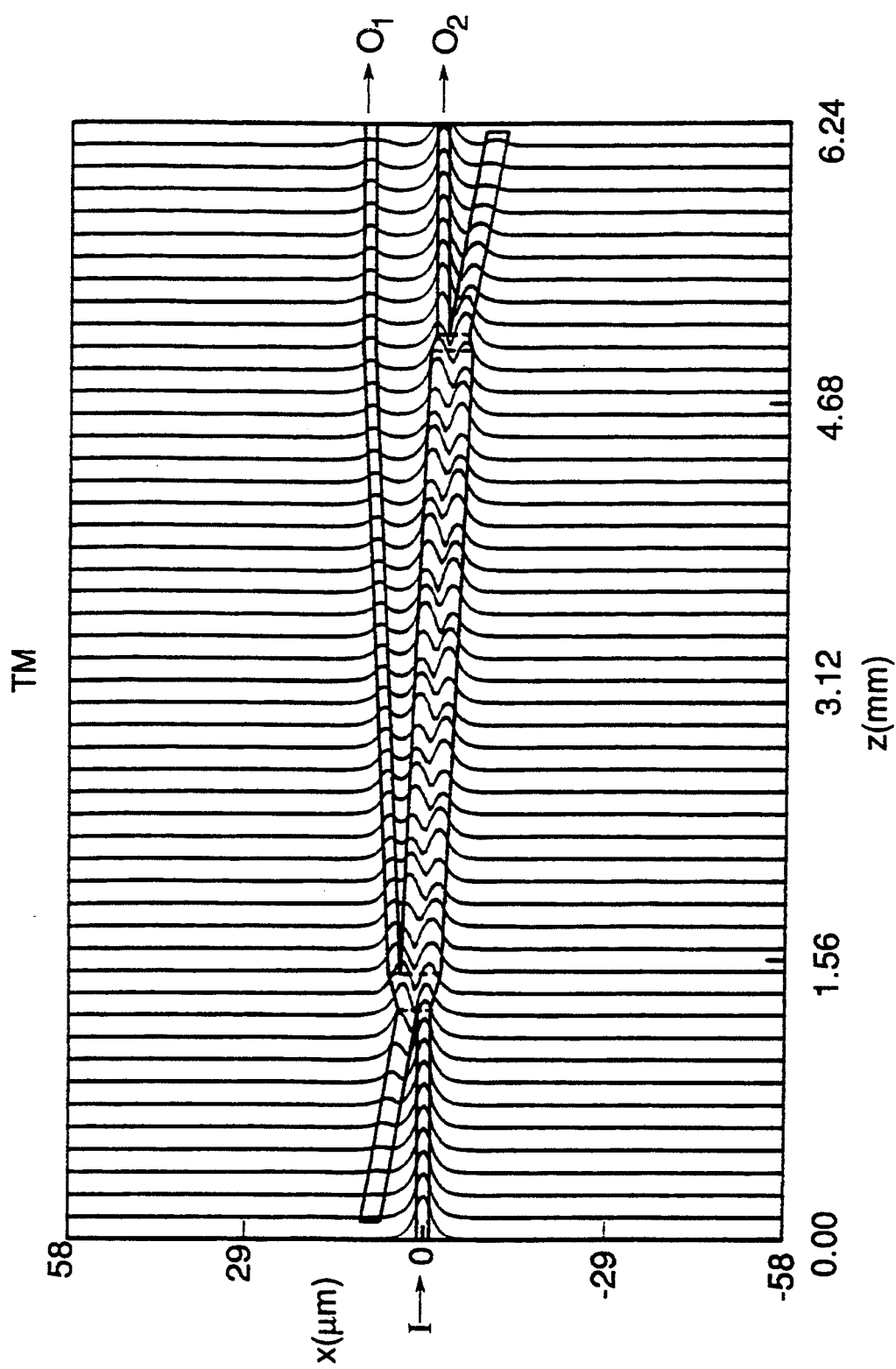

FIG. 2b depicts the course of propagation in the case where the optical signal (arrow I) entering section A is a signal which exclusively contains the TE polarization. Result: 90% of the TE signal exits according to the arrow O1 and 1.4% according to the arrow O2; attenuation: −0.4 dB and crossover: −18 dB. FIG. 2c depicts a similar course in the case where the incoming signal (arrow I) exclusively contains the TM polarization. Result: 90% of the TM signal exits according to the arrow O1 and 5% according to the arrow O2; attenuation: 0.2 dB and crossover: −12.8 dB.

In the polarization splitters described above, the constituent waveguiding sections have, on the grounds of the $\mu me$ reversal invariance principle, an identical but reverse action fox' optical signals having an opposite propagation direction. The splitter therefore acts, for signals in the opposite direction, as a polarization combiner or multiplexer or as a polarization filter. If signals having a pure polarization (i.e. a pure TE signal according to the arrow O1, and a pure TM signal according to the arrow O2) are input to the output guides (26, 27 in FIG. 2a) opposite to the direction of the arrows O1 and O2, the combined signal emerges at the input guide (21 in FIG. 2a) opposite to the direction of arrow I. From a signal having both polarization components (TE and TM), input to an output guide in a direction opposite to the arrow O1 or O2, the polarization component which does not match the output guide in question (i.e. TM for the output guide with arrow O1 and TE for that with arrow O2) will be filtered away, so that a pure TE or TM signal appears at the input guide.

I claim:

1. Integrated optical device for manipulating the polarization of light-wave signals, comprising
   a substrate, and
   an optical-waveguide thin layer supported by the substrate and provided with
      a first waveguiding section including a first channel-shaped waveguide,
      a second waveguiding section including second and third channel-shaped waveguides which are optically decoupled and physically separated, and
      an intermediary waveguiding section for an adiabatic coupling between the first and the second waveguiding sections, including an asymmetric Y branching device provided with a first and a second, mutually diverging intermediary channel-shaped waveguide, coupled, respectively, with the second and the third waveguides of the second section, characterized in that
   the first intermediary waveguide has a waveguide profile corresponding to a first guide modality for the propagation of a first guided mode for each of both polarizations, the second intermediary waveguide has a waveguide profile corresponding to a second guide modality of higher order than the first guide modality for the propagation of said first guided mode and a second guided mode of higher order than the first for each of both polarizations, the difference of the propagation constant of said first guided mode in the first intermediary waveguide and the propagation constant of said second guided mode in the second intermediary waveguide for the one polarization differing in sign from the difference of the propagation constant of said first guided mode in the first intermediary waveguide and the propagation constant of said second guided mode in the second intermediary waveguide of the other polarization.

2. Integrated optical device according to claim 1, characterized in that the first intermediary guide is monomodal and the second intermediary guide is bimodal,
   in that the channel-shaped waveguides of the first and second waveguiding section are monomodal,
   in that the intermediary section further comprises a first coupling section for an adiabatic coupling of the first channel-shaped waveguide of the first waveguiding section with the intermediary waveguides, and a second coupling section for the adiabatic coupling of the bimodal waveguide with one of the waveguides of the second waveguiding section, and in that between the first channel-shaped waveguide and the first coupling section a first polarization-insensitive mode converter is incorporated for converting a zeroth-order guided mode into a first-order guided mode and vice versa, and between the second coupling section, by means of which the bimodal waveguide is coupled with one of the waveguides of the second waveguiding section, a second polarization-insensitive mode converter is incorporated for converting a first-order guided mode into a zeroth-order guided mode and vice versa.

3. Integrated optical device according to claim 2, characterized in that the polarization-insensitive mode converters are asymmetric Y-junctions having a bimodal trunk and monomodal branching waveguiding channels having mutually different propagation constants, the branching channel having the lowest propagation constant being directly coupled with the monomodal guide in question of the first or the second waveguiding section.

4. Integrated optical device according to claim 1, 2 or 3, characterized in that the intermediary waveguides and the coupling sections are of the ridge type.

* * * * *